United States Patent
Lansing et al.

(10) Patent No.: US 8,485,046 B2
(45) Date of Patent: Jul. 16, 2013

(54) ULTRASONIC FLOW METER AND METHOD INCLUDING A TEST PROCEDURE TO VERIFY THE OPERATION OF THE ELECTRONIC

(75) Inventors: John Lansing, Houston, TX (US); Toralf Dietz, Dresden (DE)

(73) Assignee: Sick Engineering GmbH, Ottendorf-Okrilla (DE)

( * ) Notice: Subject to any disclaimer, the term of this patent is extended or adjusted under 35 U.S.C. 154(b) by 355 days.

(21) Appl. No.: 12/883,230

(22) Filed: Sep. 16, 2010

(65) Prior Publication Data

US 2012/0060623 A1      Mar. 15, 2012

(30) Foreign Application Priority Data

Sep. 9, 2010   (EP) .................................... 10009388

(51) Int. Cl.
    *G01F 1/66*        (2006.01)
(52) U.S. Cl.
    USPC ........................................ 73/861.27; 702/48
(58) Field of Classification Search
    None
    See application file for complete search history.

(56) References Cited

U.S. PATENT DOCUMENTS

| 8,245,582 B2 * | 8/2012 | Lansing et al. ............ 73/861.29 |
| 2003/0233860 A1 | 12/2003 | Deane |
| 2005/0055171 A1 | 3/2005 | Freund, Jr. |
| 2008/0066557 A1 | 3/2008 | Yoshida |

FOREIGN PATENT DOCUMENTS

| EP | 1 197 732 A1 | 4/2002 |
| EP | 2 009 410 A1 | 12/2008 |
| WO | 2010/057951 A2 | 5/2010 |

OTHER PUBLICATIONS

European Search Report, Application No. EP 10 00 9388, mailed on Jun. 1, 2011.

* cited by examiner

*Primary Examiner* — Harshad R Patel
(74) *Attorney, Agent, or Firm* — Nath, Goldberg & Meyer; Jerald L. Meyer; Scott C. Langford

(57) ABSTRACT

The invention relates to an ultrasonic gas flow meter and corresponding method of verification, where the ultrasonic gas flow meter comprises at least one signal evaluation unit, memory, piping through which gas can flow, and ultrasonic transducers disposed on opposite sides of the piping; the ultrasonic gas flow meter is adapted to detect a flow velocity of the gas flowing through the piping. The method comprises a test procedure for verifying the operation of electronics associated with the ultrasonic gas flow meter wherein, when the test procedure is activated, test signals are triggered which replace the propagation times measured with predefined propagation times associated with an assumed gas flow velocity and the output of the evaluation unit is detected to see how the calculated gas flow velocity compares to the assumed gas flow velocity.

8 Claims, 2 Drawing Sheets

Figure 1:
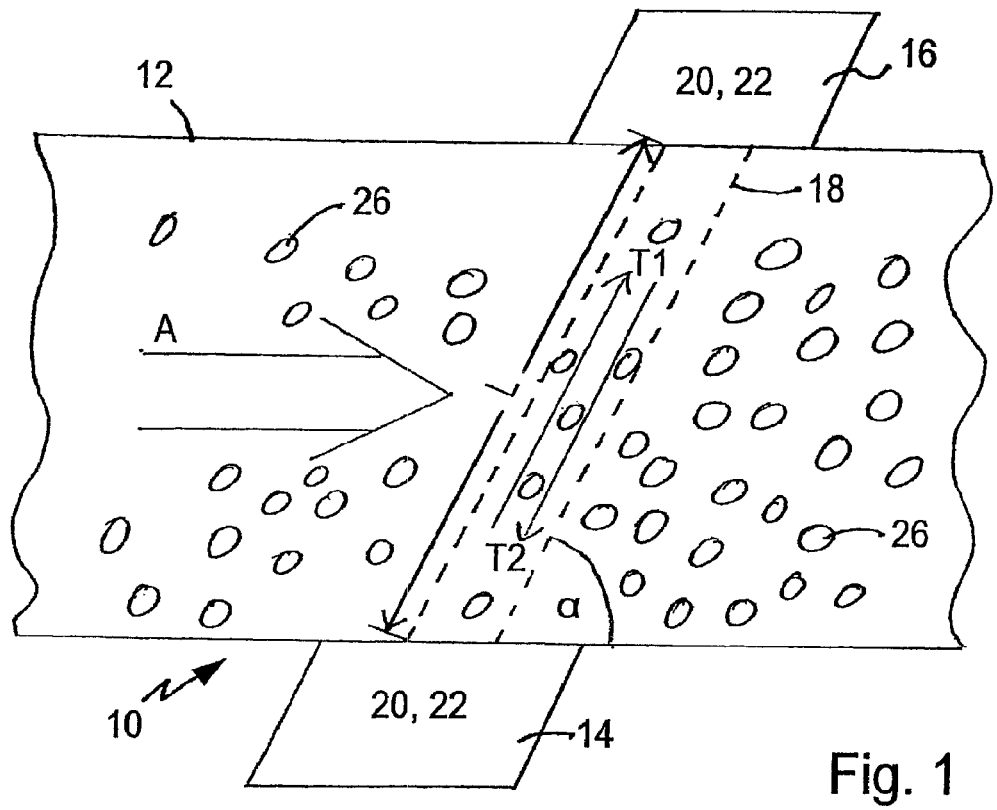

ULTRASONIC FLOW METER AND METHOD INCLUDING A TEST PROCEDURE TO VERIFY THE OPERATION OF THE ELECTRONIC

The invention relates to a method of operating an ultrasonic gas flow meter and to an ultrasonic gas flow meter.

The accuracy of the measurement of the flow velocity of a gas in a piping using an ultrasonic gas flow meter among other things depends on the parameters of the selected measurement geometry. These parameters include the determination of the exact position of the different components arranged relative to one another, the sensor lengths, the sensor signal transit times and the electronic signal transit times. Since these parameters can only be determined to a certain degree of accuracy, the calculation of gas flow velocities based on measured signal propagating times always includes a small uncertainty. These parameters are usually device specific and are calibrated for each device and stored in that device during the production thereof. The measurement uncertainty can be further reduced by calibrating the device on a suitable test stand to a technically achievable minimum of smaller than ±0.2% during commissioning.

However, should the ultrasonic gas flow meter require maintenance or repairing (exchange of sensors, or electronics associated with the ultrasonic gas flow meter) the parameters (lengths, angles and transit times) of the exchange components have to be input to the repaired device accordingly. In this respect the number of parameters to be corrected can be substantial. For example, the replacement of an amplifier circuit in the electronics requires the correction of eight parameters.

On correct exchange of the components during maintenance and/or repair, the measurement accuracy is only influenced insignificantly. However, the functional and regulatory examination following this repair is costly and time-consuming, since all parameters have to be checked at each point in the read-out chain. A comparison of a measured flow velocity with the actual flow velocity can usually not be carried out in an installed apparatus as the actual flow velocity would only be known if a second gas flow meter would be simultaneously connected in series. In a worst case scenario a regulatory official can request the removal of the ultrasonic gas flow meter and the recalibration thereof.

It is therefore an object of the invention to provide a defined test arrangement which allows the chain of components of an electronic gas flow meter be tested, in particular after an exchange of components in the electronics associated therewith.

This object is satisfied by a method in accordance with the subject matter disclosed herein. The dependent claims are directed at preferred embodiments of the method in accordance with the invention.

The inventive method serves for operating an ultrasonic gas flow meter, said ultrasonic gas flow meter including at least one signal evaluation unit, at least one memory, a piping through which gas can flow, at least one pair of ultrasonic transducers disposed on opposite sides of said piping and separated by a path inclined to a flow direction of said piping, wherein each ultrasonic transducer is connected to an electronic circuit to selectively act as an ultrasonic transmitter and an ultrasonic receiver, wherein said ultrasonic gas flow meter is adapted to detect a flow velocity of said gas flowing through said piping on the basis of differences between propagation times of ultrasonic signals transmitted and received between each pair of transducers and propagating in opposite directions along said path, wherein said method includes a test procedure for verifying the operation of electronics associated with said ultrasonic gas flow meter wherein, when said test procedure is activated, test signals are triggered which replace said propagation times with predefined propagation times associated with an assumed gas flow velocity and the output of the evaluation unit is detected to see how the calculated gas flow velocity compares to the assumed gas flow velocity.

By replacing signals corresponding to measured propagation times with test signals representing predefined propagation times, the electronics associated with the ultrasonic gas flow meter can be tested. This test can take place in situ, i.e. a regulatory official or a mechanic does not need to have the ultrasonic gas flow meter removed to test the working of the electronics thereof. This saves considerable time and reduces the downtime of a system. This ultimately reduces the running costs of such systems and increases the system efficiency.

In a preferred embodiment the test signals are configured as representative signals output from said ultrasonic transducers to obtain test values for said electronic circuits at an output of said evaluation unit for comparison with expected test values.

In this case, if the test value obtained at the evaluation unit is in agreement with the expected test value, then the complete chain of electronics associated with the ultrasonic gas flow meter is working correctly, i.e. the regulatory official knows that all of the electronics associated with the ultrasonic gas flow meter is working and that no repair or calibration of this has to be carried at a remote test stand. Furthermore, since this test is carried out by the system and does not depend on a user input, no user error can be associated with this test. This increases the reliability of such tests. Moreover, the regulatory official is not required to be familiar with the precise working parameters of the electronics associated with the ultrasonic gas flow meter being tested. In fact, he only needs to monitor that the test procedure is carried out appropriately and can evaluate the efficiency of the system in dependence of the outcome of this test.

In a further embodiment of the inventive ultrasonic gas flow meter, said test signals are configured as representative signals output from said electronic circuits to obtain test values for electric circuits arranged between said electronic circuits and said evaluation unit, to obtain test values for said electric circuits at said output of said evaluation unit for comparison with expected test values.

The provision of providing a second form of test signals which only tests part of the chain of electronics associated with the evaluation unit enables a mechanic or a regulatory official to determine if that part of the electronics associated with the ultrasonic gas flow meter is working correctly, even when the complete chain of components outputs a faulty result. Should this part of the chain of electronics work correctly, then the mechanic and/or the regulatory official can exchange the faulty component in situ. This can lead to a considerable reduction in maintenance time and cost, since no remote testing of the electronics has to take place, if only a single part of the electronics is not working correctly.

In a further embodiment the test signals are configured as representative signals input into said evaluation unit to obtain test values for said evaluation unit at said output of said evaluation unit for comparison with expected test values.

This advantageously enables a testing of the evaluation unit associated with the ultrasonic gas flow meter. This is beneficial e.g. if the evaluation unit has been updated, i.e.

equipped with new hardware and/or software, since this can now be tested in situ and not on a remote test stand as was previously the case.

In a further embodiment the expected test values are stored in said at least one memory and said expected test values correspond to calibrated values for said predefined propagation times.

Providing a memory which includes the expected test values associated with the ultrasonic gas flow meter ensures that when any electronic component associated with the ultrasonic gas flow meter is exchanged, the parameters which are required to operate the ultrasonic gas flow meter at the desired measurement accuracy are stored and are available for future use. This memory can be included in the same housing as the evaluation unit and/or it can be connected to the evaluation unit. It is conceivable that a backup memory storing expected test values, parameters associated with the ultrasonic gas flow meter and the test procedure can also be included in an ultrasonic gas flow meter.

In an embodiment a difference between said test values and said expected test values is formed. Forming this difference allows a straightforward recognition of whether the electronics associated with the ultrasonic gas flow meter is working correctly. Advantageously this difference and/or the calculated test values can be stored in a memory of the ultrasonic gas flow meter. Storing these values enables long term monitoring of the performance of the ultrasonic gas flow meter electronics. This difference can also be used to form an output signal of the test procedure.

In an advantageous embodiment a warning signal is output by said test procedure if a difference between said expected test values and said test values exceeds and/or falls below threshold limits.

Alternatively or additionally, the test procedure can be adapted to initiate a system shut down in which the ultrasonic gas flow meter stops working if the difference exceeds and/or falls below the threshold limits.

These threshold limits are typically set in dependence on the type of gas for which the ultrasonic gas flow meter should be used. This is, for example, because certain types of gases are more expensive than other types of gases and it is desirable to know the exact amount of gas flowing through an ultrasonic gas flow meter arranged e.g. in a pipeline system with higher accuracy, so that if a plurality of ultrasonic gas flow meters are used to monitor the gas flow in such a system, a pipeline operator can identify if one or more meters show a reduced gas flow indicating a leak in a part of the pipeline system. The operator can accordingly initiate that the part of the pipeline registering a loss of gas is shut off from the gas supply to ensure that as little gas as possible is lost from such a system. At least one threshold limit can also be set so that it is proportional to a measurement accuracy of said ultrasonic gas flow meter.

Moreover, it should be noted that in this context an ultrasonic gas flow meter generally has the ability to also measure the flow velocity of mediums, which contain a mixture of gaseous and liquid components, i.e. mediums which are not purely a gas or a liquid, but a mixture of both. For this reason the term gas used in this application also refers to such mediums containing such mixtures.

Typical gases conveyed in such systems are $N_2$, $O_2$, $H_2$, $CO_2$, $Cl_2$, natural gas etc. There is generally no technical restriction on the type of gas which can be guided through an ultrasonic gas flow meter.

In a further embodiment the predefined propagation times can be selected in dependence of different velocities of sound of the gas to be measured. Since the velocity of sound changes for different types of gases, different pipeline systems transporting different types of gases may be calibrated in accordance with the type of gas to be transported in that piping. This is because different velocities of sound cause different propagation times for the ultrasonic waves transported in the system. This time difference can also influence the accuracy of the system.

In a further embodiment the expected test values correlate to values for a velocity of sound selected or selectable in dependence on a type of gas flowing through said piping, and/or wherein said sound velocity is selected in the range from 100 m/s to 2000 m/s, preferably a velocity of sound of approximately 400 m/s is selected.

In a further embodiment the test procedure is adapted to be carried out for a plurality of preselectable gas flow velocities. For example, the minimum selectable gas flow velocity can be set to 0 m/s, i.e. the situation when no gas is present in the piping and the propagation times of the ultrasonic waves correspond to propagation times of the ambient pressure selected for the gas system. Similarly, the selectable maximum gas flow velocity can correspond to the maximum flow velocity obtainable for the gas transported in said piping, i.e. when the piping is completely filed with gas and operated at the maximum gas transport pressure.

In a further embodiment a plurality of test values are obtained and compared to said expected test values. By providing a plurality of test pulses the statistical error from a single measurement can be significantly reduced.

So that the pipeline system can be monitored not only when a regulatory official checks the operation of the ultrasonic gas flow meter at periodic intervals, the test procedure can be adapted so that it can be repeated at selectable time intervals during the continued operation of the ultrasonic gas flow meter. Implementing such a periodic test ensures that a fault can be recognized earlier, the downtime of the system can subsequently be reduced which can increase the overall efficiency of the system.

In a further aspect of the invention, this provides an ultrasonic gas flow meter including at least one signal evaluation unit, at least one memory, at least one pair of ultrasonic transducers disposed or to be disposed on opposite sides of a piping through which gas can flow and separated by a path inclined to a flow direction of said piping, wherein each ultrasonic transducer is connected to an electronic circuit to selectively act as an ultrasonic transmitter and an ultrasonic receiver, wherein said ultrasonic gas flow meter is adapted to detect a flow velocity of said gas flowing through said piping on the basis of differences between propagation times of ultrasonic signals transmitted and received between each pair of transducers and propagating in opposite directions along said path, said ultrasonic gas flow meter also includes a memory including a test procedure adapted to verify the operation of electronics associated with said ultrasonic gas flow meter, in particular when said test procedure is activated, test signals can be triggered which replace signals corresponding to said propagation times with predefined propagation times associated with an assumed gas flow velocity and the output of the evaluation unit can be detected to see how the calculated gas flow velocity compares to the assumed gas flow velocity.

In an embodiment of the inventive ultrasonic gas flow meter this includes a pulser which is adapted to generate pulse signals for testing the operation of the electronics associated with the ultrasonic gas flow meter.

In a further embodiment of the ultrasonic gas flow meter the signal generator is adapted to produce test signals having different configurations to provide test signals to different points of the ultrasonic gas flow meter electronics.

The apparatus in accordance with the invention can be adapted using the features described with reference to the method in accordance with the invention and its advantageous embodiments.

The advantageous features are described in an exemplary manner only and are not intended to restrict the inventive method or apparatus in any way.

Figure 2:
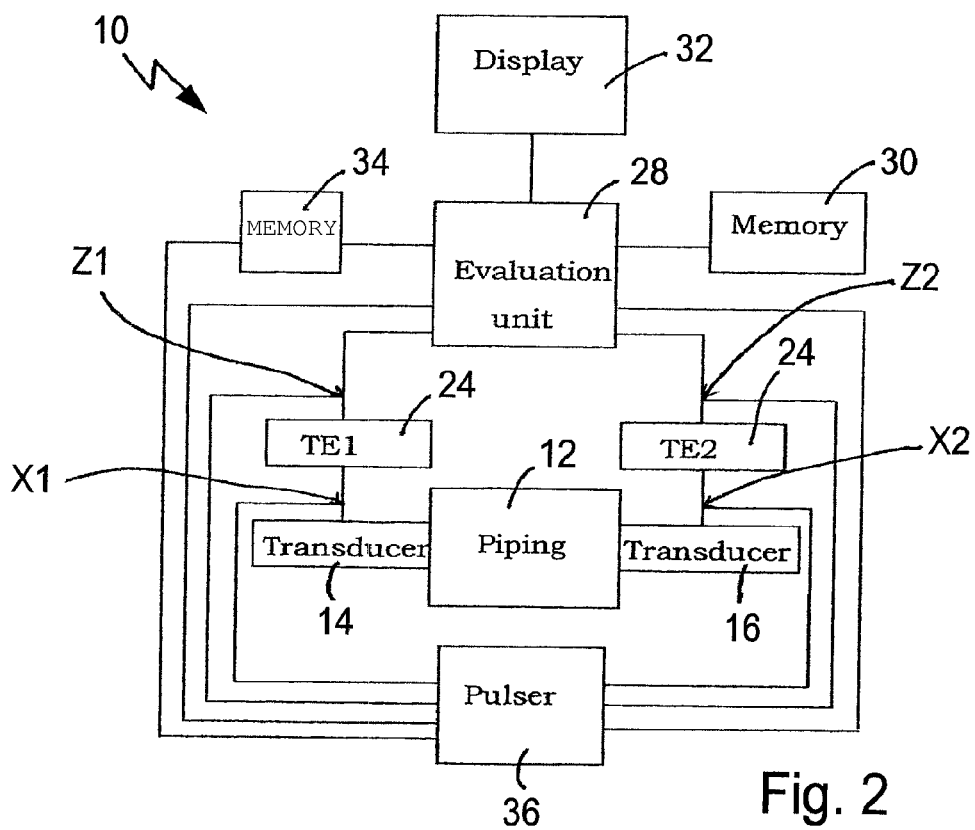
Figure 3:
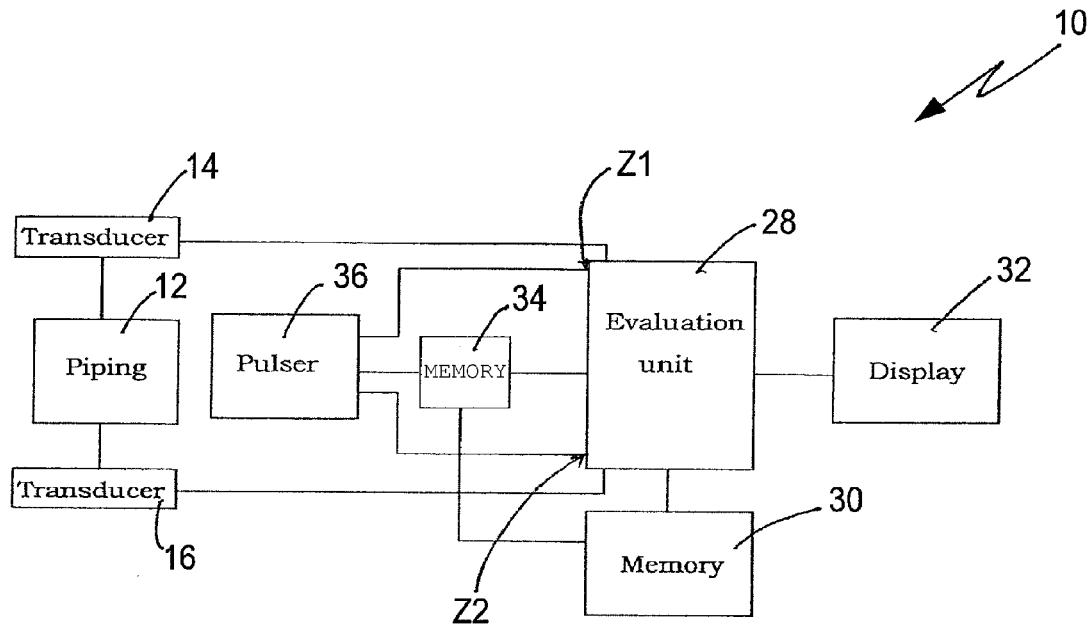
Figure 4:
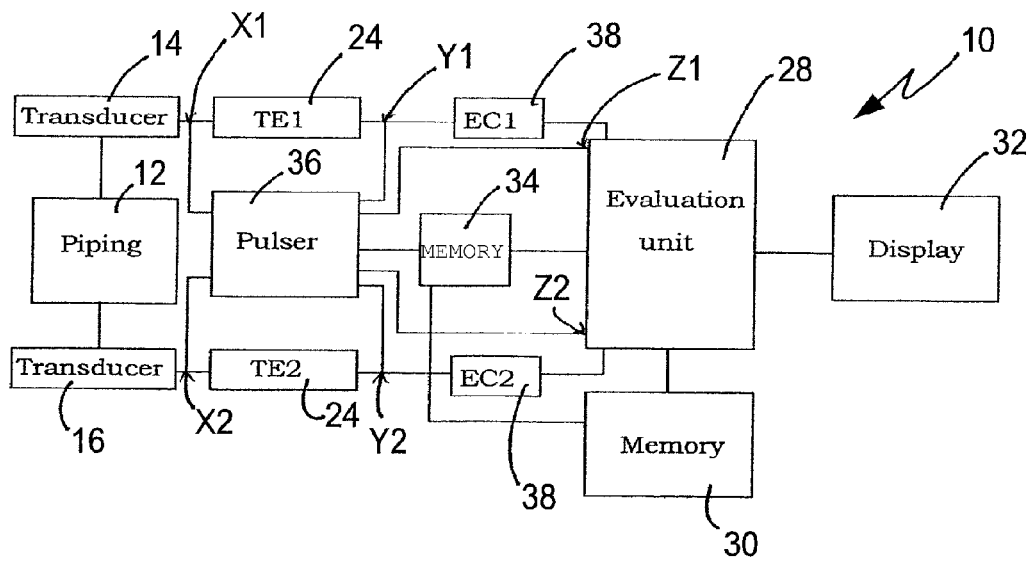

The invention will be described in the following with respect to further features and advantages by way of examples with reference to embodiments in the enclosed drawings. The Figures of the drawings show:

FIG. 1 a schematic representation indicating how propagation times are measured;

FIG. 2 an embodiment of an apparatus to perform a method in accordance with the invention;

FIG. 3 a further embodiment of an apparatus to perform a method in accordance with the invention; and FIG. 4 a further embodiment of the apparatus to perform a method in accordance with the invention.

Features having the same or similar function will be described in the following using the same reference numeral.

FIG. 1 shows a schematic representation indicating how a transit time ultrasonic gas flow meter 10 works in principle. In particular, FIG. 1 shows a section through a piping 12 indicating a flow direction A of the flowing gas 26. In this example a pair of ultrasonic transducers 14, 16 are disposed on opposite sides of the piping 12 and separated by a path 18 having a length L which is inclined at an angle α to the flow direction A of the piping 12. Each ultrasonic transducer 14, 16 includes an ultrasonic emitter 20 and an ultrasonic receiver 22. On activation of electronics 24 (see below) associated with the ultrasonic transducers 14, 16 a first transducer 14 will transmit an ultrasonic signal which is received by a receiver 22 of a second transducer 16 and in a similar manner when the electronics 24 of the second transducer 16 is activated, this transmits an ultrasonic pulse along said path 18 which is subsequently received by the first transducer 14. Once these propagation times have been measured using the ultrasonic transducers 14, 16 and processed in electronics 24, 28 (see below) associated with the ultrasonic gas flow meter 10, these propagation times of the ultrasonic pulses transmitted by the respective ultrasonic transducers 14, 16 are used to calculate a flow velocity for a gas 26 present in the piping 12.

It should be noted that in the present context the term piping is used to also denote a duct or a conduit, provided that this is a closed conduit or closed duct, i.e. a conduit which generally has no form of opening along the perimeter of its cross-section unless it is a connection point or an inlet/outlet.

The flow velocity can be calculated using equation (1) below:

$$v = \frac{T2 - T1}{T1 \cdot T2} \cdot \frac{L}{2\cos\alpha} \quad (1)$$

wherein v is the flow velocity of the medium 26 flowing through the piping 12, T1 and T2 are the respective propagation times of an ultrasonic signal transmitted in and against the gas flow direction A, L is the path length L of the ultrasonic path 18 and α is the angle at which this path 18 is inclined to the flow direction A.

FIG. 2 schematically shows an ultrasonic gas flow meter 10 in accordance with the invention, in which a pair of transducers 14, 16 is arranged at opposite sides of the piping 12, each transducer 14, 16 is connected to transducer electronics 24. The output of the respective transducer electronics 24 is connected to an evaluation unit 28 for the calculation of a gas flow velocity in the piping 12.

The evaluation unit 28 can include a digital signal processor (DSP—not shown) with which the signals from the transducer electronics 24 are digitized and processed. The evaluation unit 28 is connected to a memory 30 in which the parameters such as the path length L and the angle α at which the propagation path 18 is inclined to the flow direction A are stored. Furthermore, parameters associated with electronics 24, 28 included in the read-out chain are stored in the memory 30, so that the evaluation unit 28 can use these to process the signals received from the transducers 14, 16. The resultant gas flow velocity can finally be output e.g. via a display 32.

FIG. 3 shows a further embodiment of the apparatus 10 in accordance with the invention. In this embodiment the signals from the transducers 14, 16 are directly input into the evaluation unit 28 for the calculation of the gas flow velocity in the piping 12. The analysis of the gas flow velocity in the piping 12, however, is the same as that described for FIG. 2.

Turning now to FIG. 4, we see a further embodiment of the invention. In this embodiment an electric circuit 38 is connected between the transducer electronics 24 and the evaluation unit 28.

The ultrasonic gas flow meter 10 of the present invention also includes a test procedure stored in a memory 34. This test procedure will now be explained in exemplary manner with reference to the embodiment of FIG. 4. When the test procedure is activated, a pulser 36 or a signal generator 36 produces test signals PX1, PX2; PY1, PY2; and/or PZ1, PZ2 (see Table 1) which correspond to the signals delivered by either of the transducers 14, 16. These test signals PX1, PX2, PY1, PY2, PZ1, PZ2 can be configured such that they are correlated to predefined propagation times which are associated with an assumed gas flow velocity, to simulate a measured gas flow velocity and to check the chain of components in an ultrasonic gas flow meter 10.

These test signals PX1, PX2; PY1, PY2; and/or PZ1, PZ2 can be fed through the electronic circuits 24, 28, 38 associated with the ultrasonic gas flow meter 10 via the positions X1, X2, Y1, Y2, Z1, Z2, respectively and thereby test the electronics of the ultrasonic gas flow meter 10. Should the gas flow velocity calculated from these test signals PX1, PX2, PY1, PY2, PZ1, PZ2 be significantly different to the assumed gas flow velocity, then a regulatory official and/or a mechanic knows that the electronics 24, 28, 38 associated with the ultrasonic gas flow meter 10 is not working correctly. Fortunately, if the difference between the calculated and assumed gas flow velocity is negligible, then the regulatory official knows that the electronics 24, 28, 38 operating in the ultrasonic gas flow meter 10 is working correctly. The results of these comparisons are then output onto the display 32.

The pulser 36 is able to produce a plurality of different types of test signals PX1, PX2, PY1, PY2, PZ1, PZ2 which are equivalent to pulse signals expected by the electronic circuits 24, 28, 38 in question. In this way a test procedure can be carried out which not only tests the complete chain of electronics components 24, 28, 38 used, but if a fault is detected when the complete chain of electronic components 24, 28, 36 is tested, the test procedure can produce different pulses PX1, PX2, PY1, PY2, PZ1, PZ2 for the different inputs of the different electronic components 24, 28, 38 associated with the ultrasonic gas flow meter. This advantageously enables the ultrasonic gas flow meter 10 to indicate which component 24, 28, 38 is not working correctly. This enables a technician supervising the day to day workings of this gas flow meter 10 to easily recognize which component 24, 28, 38 is not working correctly so that this can be repaired accordingly.

Table 1 shows a listing of the different pulses PX1, PX2, PY1, PY2, PZ1, PZ2 which can be administered to the different components e.g. the transducer electronics 24, the evaluation unit 28, and/or the electric circuits 38 of an apparatus 10 in accordance with the invention. These pulses PX1, PX2, PY1, PY2, PZ1, PZ2 are based on assumed gas flow velocities ($v_{exp}$). The table also shows ways in which a difference between the assumed gas flow velocities and the calculated gas flow velocities can be calculated. The simplest difference is formed by subtracting the test value from the expected test value.

Naturally, it is also possible to only administer test pulses PX1 and PX2 at X1 and X2, respectively, and to check the output of the evaluation unit 28 for comparison with an assumed gas velocity. This serves to examine the complete chain of components 24, 28, 38 in one measurement.

The method in accordance with the invention can also be carried out in the apparatus 10 described in FIGS. 2 and 3, the difference being that only signals PX1, PX2, PZ1, PZ2 can be provided at positions X1, X2, Z1, Z2 in FIG. 2 to examine at least one of the evaluation unit 28 and the transducer electronics 24.

Similarly in the embodiment of FIG. 3 the test pulse PZ1, PZ2 can be provided at the position Z1, Z2 to test the evaluation unit 28.

The memory storing the test procedure can naturally be incorporated in the memory 30 connected to the evaluation unit 28, so that only one memory is present in the ultrasonic gas flow meter in accordance with the invention. This memory 30 can be implemented on the same circuit board and within the same housing as the evaluation unit 28. The same is true for the pulser 36, the transducer electronics 24 and the electric circuits 28.

The evaluation unit 28 can advantageously also include a counter (not shown) which initiates a self-test of the electronics 24, 28, 38 associated with the ultrasonic gas flow meter 10 at intermittent time intervals to monitor if some or all of the electronic components are still working correctly. The evaluation unit 28 can calculate the gas flow velocity in dependence of the measured propagation times.

As described above, the test procedure does not necessarily need to know how the precise ultrasonic gas flow meter 10 works, but by comparing expected test values to measured test values using test signals configured to replace actual signals which would normally be output by the ultrasonic transducers or other components in the read out chain.

The method in accordance with the invention has been described with reference to an expected gas flow velocity using predefined propagation times. However, it should be noted that any suitable test pulse PX1, PX2, PY1, PY2, PZ1, PZ2 can be provided at the positions X1, X2, Y1, Y2, Z1, or Z2 and these test pulses can then be compared to expected test pulses at an output of the evaluation unit 28 to investigate whether the electronics 24, 28, 38 associated with the ultrasonic gas flow meter 10 is working correctly.

| Electronic Circuits 24 propagation time pulse | Electric Circuits 38 propagation time pulse | Evaluation Unit 28 propagation time pulse | Expected test value | Resulting test value | Difference | Difference (%/100) |
|---|---|---|---|---|---|---|
| PX1 | PY1 | PZ1 | $v_{exp}$ | $v_{test}$ | $v_{exp} - v_{test}$ | $\dfrac{v_{exp} - v_{test}}{v_{exp} + v_{test}}$ |
| PX2 | PY2 | PZ2 | | | | |

Table 1 shows the different type of test signals PX1, PX2, PY1, PY2, PZ1, PZ2 which are based on propagation times associated for an assumed gas velocity, which can be input into the electronics 24, 28, 36 associated with the ultrasonic gas flow meter 10 at different positions of the read out chain.

LIST OF REFERENCE NUMERALS 10 ultrasonic gas flow meter
12 piping
14 transducer
16 transducer
18 path
20 emitter
22 receiver
24 transducer electronics
26 gas
28 evaluation unit
30 memory
32 display
34 test memory
36 pulser
38 electric circuit
A flow direction
L path length
PX1 test signal
PX2 test signal
PY1 test signal
PY2 test signal
PZ1 test signal
PZ2 test signal
T1 propagation time
T2 propagation time

The invention claimed is:

1. A method of operating an ultrasonic gas flow meter, the ultrasonic gas flow meter including at least one signal evaluation unit, at least one memory, a piping through which gas can flow, at least one pair of ultrasonic transducers disposed on opposite sides of the piping and separated by a path inclined to a flow direction of the piping, wherein each ultrasonic transducer is connected to an electronic circuit to selectively act as an ultrasonic transmitter and an ultrasonic receiver, wherein the ultrasonic gas flow meter is adapted to detect a flow velocity of the gas flowing through the piping on the basis of differences between propagation times (T1, T2) of ultrasonic signals transmitted and received between each pair of transducers and propagating in opposite directions along the path, wherein the method comprises a test procedure for verifying the operation of electronics associated with the ultrasonic gas flow meter wherein, when the test procedure is activated, test signals (PX1, PX2, PY1, PY2, PZ1, PZ2) are triggered which replace the propagation times (T1, T2) with predefined propagation times associated with an assumed gas flow velocity and the output of the evaluation unit is detected to see how the calculated gas flow velocity compares to the assumed gas flow velocity, characterized in that the test signals comprise electric circuit test signals (PY1, PY2)

which are configured as representative signals output from the transducer electronics to obtain test values for electric circuits arranged between the transducer electronics and the evaluation unit, to obtain test values for the electric circuits at the output of the evaluation unit for comparison with expected test values and/or, characterized in that the test signals comprise evaluation unit test signals (PZ1, PZ2)

which are configured as representative signals input into the evaluation unit to obtain test values for the evaluation unit at the output of the evaluation unit for comparison with expected test values.

2. The method in accordance with claim 1, wherein the test signals comprise transducer electronics test signals (PX1, PX2) which are configured as representative signals output from the ultrasonic transducers to obtain test values for the transducer electronics at an output of the evaluation unit for comparison with expected test values.

3. The method in accordance with claim 1, wherein the expected test values are stored in the at least one memory and wherein the expected test values correspond to calibrated values for the predefined propagation times.

4. The method in accordance with claim 1, wherein a warning signal is output by the test procedure if a difference between the expected test values and the test values exceeds and/or falls below threshold limits.

5. The method in accordance with claim 1, wherein the predefined propagation times can be or are selected in dependence of different velocities of sound of the gas to be measured.

6. The method in accordance with claim 1, wherein the expected test values correlate to values for a velocity of sound selected in dependence on a type of gas flowing through the piping, and/or wherein the sound velocity is selected in the range from 100 m/s to 2000 m/s, preferably a velocity of sound of approximately 400 m/s is selected.

7. The method in accordance with claim 1, wherein the test procedure is adapted to be carried out for a plurality of preselectable gas flow velocities.

8. The method in accordance with claim 1, wherein a plurality of test values are obtained and compared to the expected test values.

* * * * *